Nov. 10, 1964  J. N. KRAUSE  3,156,401
CONTAINER
Filed Oct. 17, 1960  2 Sheets-Sheet 2
FIG. 2
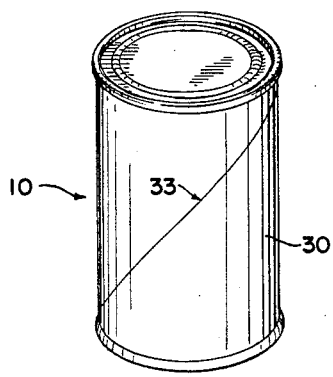
FIG. 3
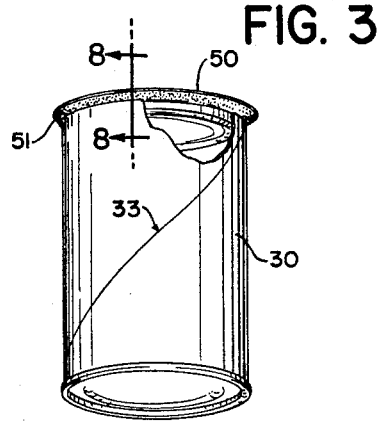
FIG. 4
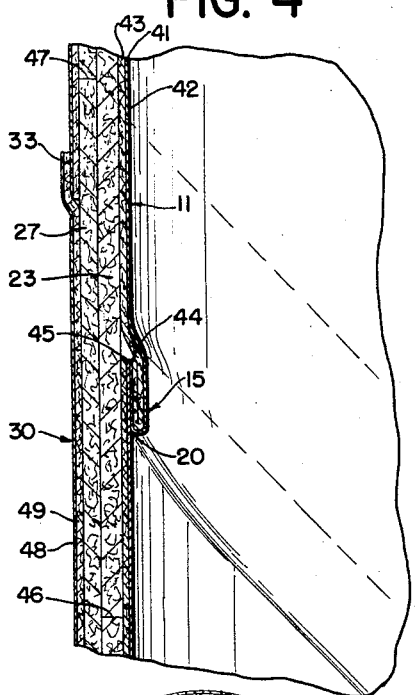
FIG. 6
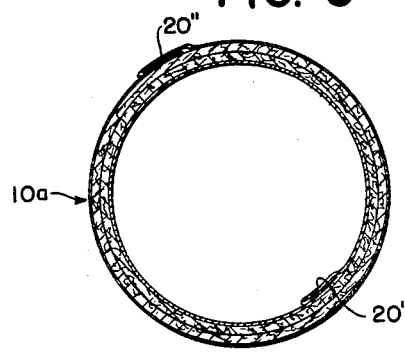
FIG. 5
FIG. 7
FIG. 8
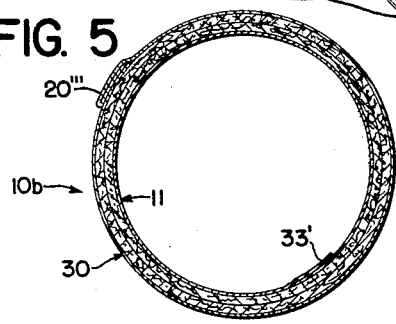
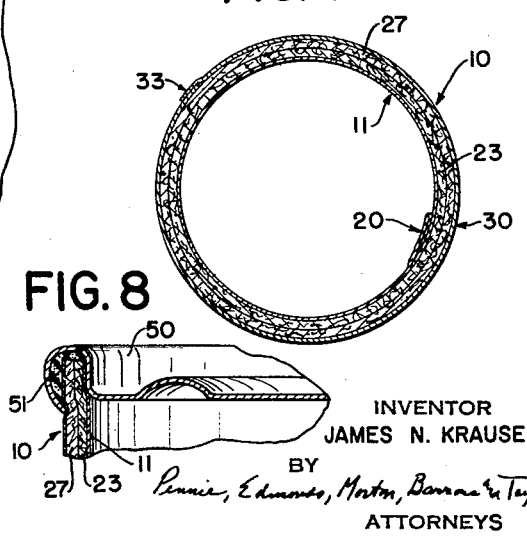
INVENTOR
JAMES N. KRAUSE
BY
Pennie, Edmonds, Morton, Barrows & Taylor
ATTORNEYS

United States Patent Office 3,156,401
Patented Nov. 10, 1964

3,156,401
CONTAINER
James N. Krause, Jefferson County, Ky., assignor to The Anaconda Aluminum Company, a corporation of Montana
Filed Oct. 17, 1960, Ser. No. 62,911
7 Claims. (Cl. 229—4.5)

This invention relates to a helically wound tubular container having a substantially rigid body with an aluminum foil surface on the inside and outside thereof and metallic caps secured to each end of the tubular container. More particularly this invention relates to containers of the above type having a rigid body formed with a helically wound liner of an aluminum foil and paper laminate, at least one ply of body stock helically wound about the liner, and a label of aluminum foil and paper laminate helically wound about the body stock and at least one of the aluminum foil and paper laminates having marginal portions of adjacent convolutions joined by a seam which maintains a foil-to-foil seal along the entire length of the seam.

It is desirable in packaging operations to avoid the use of metallic cans as often as possible due to their high cost. Many substitutes for metallic cans in packaging operations have been tried. Most have failed however, owing principally to their body construction which was usually either susceptible to seepage by the contents or too weak to withstand the rough handling to which cans are subjected. The container of the present invention has proven effective to meet all the requirements necessary to safely and satisfactorily replace a can in most any instance. The improved effectiveness of this container can be attributed to a novel design by which all the surface area on the interior or exterior of the container, or both, is made moisture impervious. This improved container has particularly proven to be satisfactory as a replacement for metallic cans in packaging frozen concentrated fruit juices and the like. Its effectiveness is primarily due to the unique construction of the body of the container.

The tubular container of the present invention comprises a substantially rigid body and has closure caps secured to each end of said body. The body has a liner ply of aluminum foil and paper laminate helically wound with the aluminum foil disposed interiorly and defining the inner surface of the container. One marginal portion of said liner ply is overlapped and adhesively sealed to the adjacent marginal edge portions of an adjoining convolution of said liner ply. At least one ply of body stock is helically wound about the liner ply and adhesively secured thereto. The edges of subsequent turns of the body stock are abutting and spaced from the helical liner ply seam resulting from said overlapping convolutions. A label ply of aluminum foil and paper laminate is helically wound about the body stock and is adhesively secured thereto with aluminum foil disposed exteriorly and defining the outer surface of the container body. One marginal portion of said label ply is overlapped and adhesively secured to the marginal edge portions of the adjacent convolutions of said label ply with the resulting label ply seam being axially spaced from the abutting edges of said body stock. At least one of said aluminum foil and paper laminate plies has a marginal portion along one side edge folded back against itself with the foil on the outside of the fold, said folded-back marginal portion being overlapped with and adhesively sealed to the adjacent marginal portions of an adjoining convolution of said ply in foil-to-foil contact therewith. The resulting helical seam between adjacent convolutions of said ply encloses both side edges of the laminate beneath the foil surface of the container body.

It is well to note that the new container has particularly desirable advantages when used for packaging of frozen concentrated juice and other frozen products. The container body has insulating properties which maintain the contents of the can in a substantially frozen state for a much greater period of time than is possible with metallic cans. As a result, after purchasing goods packaged in the new container, a longer interval may elapse before it is necessary for the consumer to refrigerate the goods to preserve them in their frozen state.

A preferred embodiment of the invention is described hereinbelow with reference to the drawings wherein:

FIG. 2 is a perspective view of the helically wound container;

FIG. 3 is a perspective view of the container showing a container cap inserted in but not crimped to the top end of the container;

FIG. 4 is a view, partly in section and on an enlarged scale, of a portion of the wall construction of the container;

FIG. 5 is a cross section of a container according to the invention having a folded seam formed at the outer label ply only of the container;

FIG. 6 is a cross section of a container according to the invention having folded seams formed both at the inner liner and the outer label plies of the container;

FIG. 7 is a cross section of a container according to the invention having a folded seam at the inner liner ply only of the container; and FIG. 8 is a sectional view taken substantially along the line 8—8 of FIG. 3 showing the container cap crimped on the end of the container.

Figure 1:
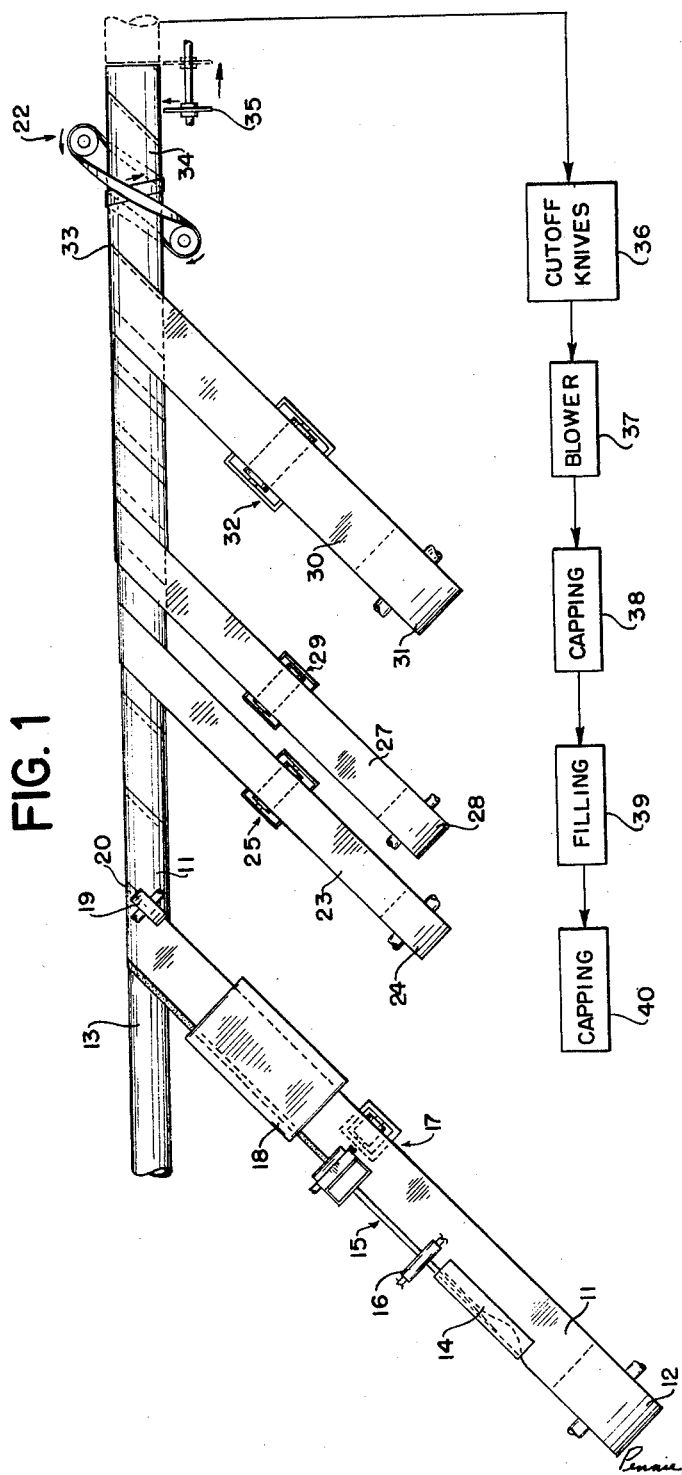
FIG. 1 shows schematically the forming of the helically wound container body of the invention.

The body construction of a container 10 (FIG. 2) of the type contemplated by the present invention is best shown by describing a method of making the container with particular reference to FIG. 1 and FIG. 4. Initially a web of liner 11 which consists of an aluminum foil and paper laminate is unwound from a roll 12 and helically wound about an adjacent stationary mandrel 13. Prior to winding the liner web 11 on the roll 12, marginal portions on each side edge of the foil surface of the liner web were coated with a suitable adhesive. As the liner web 11 is unwound from the roll 12 it is first fed through a plow 14 which receives a marginal edge portion of the liner web and turns it back against itself. As shown in FIG. 1 the liner web 11 is helically wound on the mandrel 13 with the aluminum foil surface facing down in direct contact with the mandrel. Hence after passing through the plow 14 a marginal portion 15 of aluminum foil now faces up along the entire length of one edge of the liner web 11. Immediately upon emerging from the plow 14 the marginal portion 15 passes through a roller 16 which substantially flattens the fold.

The liner web 11 which has been precoated with an organic coating to facilitate slipping of the liner along the mandrel 13, to protect the aluminum from any corrosive effect of the contents of the container and to fill any pinholes in the foil itself, next passes over an applicator 17 which applies an adhesive to one or both edges of the foil surface. The purpose of applying the adhesive is to facilitate making a foil to foil seal when the liner is wound around the mandrel. The liner 11 next passes through a heater 18 which serves to dry and remove the solvent from the adhesive that has just been applied. The liner web 11 is then passed to the mandrel 13 where it is helically wound thereon at approximately a 45° angle to axis of the horizontally extending mandrel. As shown, with each convolution of the liner web 11 upon the mandrel 13 the unfolded marginal portion of the liner web overlaps the marginal portion 15 of a previously wound convolution of the liner web 11 an amount equal to the width of the marginal portion 15. As the liner web 11 overlaps a previously wound convolution of liner web, the overlapping portions are heat and pressure sealed by a heated wheel 19 which is positioned to follow the path of the helical overlappings as the liner web is wound and compresses the adhesive coated marginal portions together such that a closed seam 20 is formed having foil-to-foil interface. As shown in FIG. 4 since the marginal edge portion 15 makes foil-to-foil contact with the marginal edge portion of the adjoining turn of the liner web 11, the edges of the liner web will not be exposed to the inner surface of the resulting container and hence there will be no danger of seepage by the contents of the container edgewise through the paper component of the liner ply and into the paper backing of the liner ply.

The wound liner ply 11 is axially slid along and rotated on the mandrel 13 by means of a pulley and belt arrangement 22. A strip of body stock 23 is taken from a roll 24 and is helically wound about the liner ply 11 at substantially the same angle as the liner web was wound on the mandrel 13. As the strip of body stock 23 is removed from the roller 24 it passes over a glue applicator 25 which applies a coating of glue on that surface of the body stock which is to make direct contact with the wound liner ply 11 to enable the body stock to be adhesively secured to the liner. The strip of body stock 23 is wound with its edges in abutment with its abutting edges axially spaced from the closed seam 20. The windings are axially slid further along the mandrel 13 where a second strip of body stock 27 is removed from a roll 28, passed over a glue applicator 29 to receive a coating of glue and is wound over the first ply of body stock 23 in the same manner as the first ply was wound on the liner ply 11. The abutting edges of the second ply of the body stock 27 are axially spaced from the abutting edges of the first ply of the body stock 23.

The wound liner ply 11 and the plies of body stock 23 and 27 are axially slid further along the mandrel 13 to a point where a label ply web 30, which consists of an aluminum foil and paper laminate, is helically wound and adhesively secured to the stip of body stock 27. The label web 30 is withdrawn from a roll 31, passed over a glue applicator 32 where a coating of glue is applied to the paper backing of the label ply web and is helically wound on the body stock 27 in substantially the same manner as the plies of body stock were wound thereon. The aluminum foil surface of the label ply is disposed exteriorly and defines the outer surface of the wall of the container 10 and the label web 30 has its marginal edge portion which is adjacent the marginal edge portion of a previously wound strip in overlapping relationship and adhesively secured together to form a second seam 33.

Alternatively, it may be desirable to feed the label ply web 30 through a plow which receives a marginal edge portion of the liner web and turns it back against itself in the manner described above with respect to the liner web 11. Of course in the present instance the foil surface of the label web 30 is facing upward and hence the marginal edge portion will be turned under the label web and the foil surface of the marginal portion will face downward. These folds are the same however, since the foil is maintained on the outside of the fold in both cases. Having formed the fold as described on the label ply it is possible to form a label seam similar to the liner seam 20 wherein one marginal portion along one side edge is folded back against itself and overlapped and adhesively secured to the adjacent marginal portions of an adjoining convolution of said ply in foil-to-foil contact therewith by means of which the resulting label seam encloses both side edges of the label ply 30 beneath the outer foil surface of the container body.

The pulley and belt assembly 22 continues to move the laminated cylinder 34 of body tube stock, which has been formed by the preceding winding operations, axially along the mandrel 13. A flying saw 35 next engages the tube 34 and travels axially with the tube cutting off elongated lengths of the cylinder 34. These elongated lengths are next passed to cut-off knives 36 where they are cut to exactly the length desired. Completing the method, the cut cylinders 34 are passed to a blower 37 where a gas jet removes the dust accumulated from the cutting operation, then to capping means 38 for heat sealing and crimping a closure cap on one end of the cut cylinder, next to filling means 39 for filling the container with the desired contents and finally to a second capping means 40 for heat sealing and crimping a closure cap on the open end of the cut cylinder.

A detailed view of the construction of the wall of the container 10 is shown on an enlarged scale in FIG. 4. The container 10 formed as described above has a coating 41 on the surface area of the interior of the container which can be a vinyl chloride vinyl acetate copolymer plus wax (paraffin, carnauba, etc.). For easy and uniform application of the coating 41 to the liner web 11 the vinyl resinous composition may be mixed with an acetone-toluene methyl ethyl ketone mixed solvent. There may be single, double, or treble coatings depending upon the proposed contents of the can which determines the corrosion protection needed. Moreover since the coating 41 also serves to insure against moisture seepage through pinholes in the foil, the thickness of the foil is another factor to be considered in determining the number of coatings necessary. The liner ply 11 consists of foil 42 having a thickness ordinarily within the range of 0.00035″ to .001″ and is preferably laminated to paper 43 with a casein latex base adhesive in wide widths and then slit to the desired strip width. A typical paper 43 used is a 20 to 25 lb. natural machine glazed kraft.

As clearly shown in FIG. 4 the seam 20 is formed by folding one marginal portion 15 back against itself, overlapping a subsequent turn of liner ply an amount equal to the width of the marginal portion 15 and adhesively securing the overlapping portions. The result is a foil-to-foil seal along the entire length of the seam which is moisture impervious since the edges 44 and 45 of subsequent turns of liner are enclosed within the wall of the container beneath the liner. Hence danger of seepage into the paper backing 43 is eliminated.

The plies of body stock 23 and 27 can be made from chip board or solid kraft boards, and for cheaper construction even newsboard has proven satisfactory. The thickness of each ply of body stock ranges in typical cases from 0.0095″ to 0.026″ in thickness. Normally two plies of body stock are used; however, it sometimes becomes desirable to use three or more plies. As described above the plies are butted at their edges with the butt joints 46 and 47 staggered to give additional strength to the container body. It is also worth noting that wet strength need not be a feature of the body stock because the seam 20 is effective to prevent penetration of moisture into it.

The plies of body stock 23 and 27 are adhesively secured together by animal glue, casein-latex emulsion, vinyl-copolymer emulsion, sodium silicate, or any other desired adhesive. The choice of adhesive depends on what contribution it is desired to make to the strength of the container, its flexibility, etc. For example sodium silicate gives a stronger and more crush resistant container than organic glues and one which is less likely to become pressed into elliptical shape in the filling operation, thereby making capping more easily accomplished. Organic glues on the other hand give a softer but more resilient container which is less likely to be permanently dented.

The label ply 30 consists of aluminum foil 48 which ordinarily is from 0.0003″ to 0.0015″ in thickness, glued to paper 49 in the same manner as was the liner 11. The paper 49 is normally 30 lb. to 40 lb. machine glazed or super calendered kraft which is preferably wet strengthened whenever an open seam 33 (the edge of the paper is exposed) is to be employed on the label 30.

The cap 50 as shown in FIG. 2 is roll-crimped tightly around the outer periphery of the end of the container 10. It is often desirable, however, to heat seal the cap to the end of the container as well as to crimp it thereon. Hence as shown in FIG. 3 a deposit of thermoplastic material 51 is made on the marginal edge portion of the cap 50 prior to insertion into the end of the container. Then in the capping operation the cap is simultaneously heated and crimped onto the container. As shown in FIG. 8 this not only results in a cap tightly secured thereto which is leak proof but also in a stronger container. The thermoplastic material 51 after being heated and pressed against the end wall of the container during the crimping operation adheres to the container adding reinforcing strength at a point usually most vulnerable to destruction upon impact. It is furthermore to be noted that a container having a cap sealed thereon as described above would be less likely to have the cap blown off by the pressure of gases liberated within the container such as often occurs as the result of packaging foodstuffs such as biscuit dough and the like.

FIG. 7 shows in cross-section the container 10 as it has been described above with reference to FIG. 4. The inner surface of the container 10 has been rendered moisture impervious by the closed seam 20 joining the liner in a foil-to-foil seal, while the outer surface of the container is not impervious to moisture exterior to the container since the label 30 is joined by a simple overlapping seam 33.

The container in FIG. 7 is of the type best suited for use in holding frozen juices and the like. Since the inner surface has been rendered moisture impervious by the closed seam 20, seepage of moisture into the container body is prevented. Moreover the material recommended for use in the plies of body stock 23 and 27 contributes good insulating properties to the container. As noted previously this is very advantageous in that it allows a purchaser of goods packaged in the new container more time to transport the goods to their own freezing unit before thawing of the contents takes place.

Referring now to FIG. 6 a container 10a which is impervious to moisture penetration on its outside surface as well as the inside surface is shown. Such a container has a closed seam 20' joining the liner in a foil-to-foil seal and a closed seam 20" joining the label in a foil-to-foil seal. This type container could be subjected to a high moisture medium without fear of moisture seepage into the body stock.

As shown in FIG. 5 a container 10b which is impervious to moisture on its outside surface only is provided by joining the label in a closed seam 20''' to maintain a foil-to-foil seal along the entire length of the seam. The liner 11 on the interior of the container is joined by an open seam 33' by simply overlapping subsequent turns of liner 11. Such a container is useful for packaging of nonliquids which would be susceptible to attack from moisture and for the prevention of seepage of moisture onto the body stock of the wall of the container from the medium surrounding the exterior wall thereof.

It is of course contemplated by the present invention that the container may be used for holding contents other than frozen juices. Moreover the container should not be limited to the size of the ordinary juice container. The size of the container and its strength can be varied by varying the size of the liner, label, body stock as well as the number of plies of body stock used and the type of adhesive employed.

I claim:

1. A tubular container comprising a substantially rigid body, end closure caps secured to each end of said body, said body having at least one ply of body stock helically wound into tubular form and having secured thereto at least one surface ply formed of a laminate of co-extensive layers of aluminum foil and paper so arranged that the paper layer adjoins the body stock and the aluminum layer faces away from the body stock, the surface ply being helically wound with one marginal portion thereof overlapping the adjacent marginal portion of an adjoining convolution thereof, the one of said marginal portions of the surface ply which is outermost with respect to the body stock being reversely folded in the direction of the body stock, the paper layer of the folded marginal portion of the surface ply facing the paper layer of the adjacent portion of said ply adjacent the fold and having its aluminum foil layer on the outside of the fold, the aluminum foil layer of the folded back marginal portion of the surface ply being one of the marginal portions thereof which is lapped over and adhesively sealed to the aluminum foil layer of the adjacent marginal portion of an adjoining convolution of said ply so that the lapped portions are in foil-to-foil relation with one another, the resulting helical seam between adjacent convolutions of the surface ply thus enclosing both side edges of the paper layer thereof between the aluminum foil layer of the surface ply and the body stock of the container.

2. A tubular container according to claim 1 in which the surface ply is secured to the inner face of the tubularly formed body stock.

3. A tubular container according to claim 1 in which a surface ply is secured as defined therein to both the inner and outer faces of the tubularly formed body stock.

4. A tubular container according to claim 1 in which the end closure caps are metallic and are crimped to each end of the container, a layer of thermoplastic cement being disposed between the circumferential portions of the caps and the peripheral end portions of the container body overlain by said caps, the cement being fused into adhesive engagement with both the caps and the container body and thus reinforcing the attachment of the caps to the body.

5. A liquid-containing package comprising a tubular container having a substantially rigid body and end closure caps secured to each end of said body, and a quantity of liquid within the container, the container body having at least one ply of body stock helically wound into tubular form and having secured to the inner face thereof a surface ply formed of a laminate of co-extensive layers of aluminum foil and paper so arranged that the paper layer adjoins the body stock and the aluminum layer faces away from the body stock into contact with the liquid, the surface ply being helically wound with one marginal portion thereof overlapping the adjacent marginal portion of an adjoining convolution thereof, one of said marginal portions of the surface ply laminate being folded back against itself in the direction of the body stock, the paper layer of the folded back marginal portion of the surface ply being in face-to-face contact with a portion of said paper layer adjacent the fold and having its aluminum foil layer on the outside of the fold, the aluminum foil layer of the folded back marginal portion of the surface ply being one of the marginal portions thereof which is lapped over and adhesively sealed to the aluminum foil layer of the adjacent marginal portion of an adjoining convolution of said ply so that the lapped portions are in foil-to-foil relation with one another, the resulting helical seam between adjacent convolutions of the surface ply thus enclosing both side edges of the paper layer thereof between the aluminum foil layer of the surface ply and the body stock of the container.

6. A package according to claim 5 in which the end closure caps are metallic and are crimped to each end of the container, a layer of thermoplastic cement being disposed between the circumferential portions of the caps and the peripheral end portions of the container body overlain by said caps, the cement being fused into adhesive engagement with both the caps and the container body and thus reinforcing the attachment of the caps to the body.

7. A tubular container comprising a substantially rigid body, end closure caps secured to each end of said body, said body having at least one ply of body stock helically wound into tubular form and having secured thereto at least one surface ply formed of a laminate of co-extensive layers of fluid-impervious film and paper so arranged that the paper layer adjoins the body stock and the fluid-impervious film faces away from the body stock, the surface ply being helically wound with one marginal portion thereof overlapping the adjacent marginal portion of an adjoining convolution thereof, the one of said marginal portions of the surface ply which is outermost with respect to the body stock being reversely folded in the direction of the body stock, the paper layer of the folded marginal portion of the surface ply facing the paper layer of the adjacent portion of said surface ply adjacent the fold and having its fluid-impervious film layer on the outside of the fold, the fluid-impervious film layer of the folded back marginal portion of the surface ply being one of the marginal portions thereof which is lapped over and adhesively sealed to the fluid-impervious film layer of the adjacent marginal portion of an adjoining convolution of said ply so that the lapped portions are in film-to-film relation with one another, the resulting helical seam between adjacent convolutions of the surface ply thus enclosing both side edges of the paper layer thereof between the fluid-impervious film layer of the surface ply and the body stock of the container.

References Cited by the Examiner

UNITED STATES PATENTS

| | | | |
|---|---|---|---|
| 1,973,317 | 9/34 | Hurley | 229—4.5 |
| 2,185,391 | 1/40 | Allen | 229—4.5 X |
| 2,262,242 | 11/41 | Lenox | 229—4.5 X |
| 2,336,540 | 12/43 | Graves | 229—4.5 X |
| 2,440,339 | 4/48 | Langer. | |
| 2,508,962 | 5/50 | Moore. | |
| 2,539,450 | 1/51 | Magill | 229—4.5 X |
| 2,555,380 | 6/51 | Stuart | 229—3.5 |
| 2,658,662 | 11/53 | Paulsen. | |
| 3,042,286 | 7/62 | Pottle | 229—4.5 X |

FOREIGN PATENTS 825,196  2/38  France.

GEORGE O. RALSTON, *Primary Examiner.*

EARLE J. DRUMMOND, FRANKLIN T. GARRETT,
*Examiners.*